(12) United States Patent
Kitchener et al.

(10) Patent No.: US 8,392,058 B2
(45) Date of Patent: Mar. 5, 2013

(54) ELECTRICAL COMMUNICATIONS CIRCUIT WITH SPUR DIAGNOSTICS

(75) Inventors: Renato Kitchener, West Sussex (GB); Gunther Rogoll, Mannheim (DE); Steffen Graber, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 491 days.

(21) Appl. No.: 12/674,038

(22) PCT Filed: Nov. 14, 2008

(86) PCT No.: PCT/GB2008/003841
§ 371 (c)(1),
(2), (4) Date: Feb. 18, 2010

(87) PCT Pub. No.: WO2009/063213
PCT Pub. Date: May 22, 2009

(65) Prior Publication Data
US 2011/0190955 A1    Aug. 4, 2011

(30) Foreign Application Priority Data

Nov. 16, 2007 (GB) .................................. 0722460.3
Mar. 14, 2008 (GB) .................................. 0804767.2

(51) Int. Cl.
*G01M 17/00* (2006.01)
(52) U.S. Cl. ...................................... 701/32.1; 701/32.7
(58) Field of Classification Search ................. 701/32.1, 701/32.7
See application file for complete search history.

(56) References Cited

U.S. PATENT DOCUMENTS 6,166,836 A * 12/2000 Crameri et al. ................. 398/18
(Continued)

FOREIGN PATENT DOCUMENTS

| DE | 10112844 A1 | 9/2002 |
| EP | 1439665 A2 | 7/2004 |

(Continued)

OTHER PUBLICATIONS

International Search Report and Written Opinion, PCT/GB2008/003841, dated May 18, 2010.

(Continued)

*Primary Examiner* — Hussein A. Elchanti
(74) *Attorney, Agent, or Firm* — Lerner, David, Littenberg, Krumholz & Mentlik, LLP

(57) ABSTRACT

An electrical communications circuit comprising a power supply, a trunk section, a spur section, isolation means disposed between the trunk section and the spur section, diagnostics apparatus connected to the trunk section and a field device connected to the spur section, in which the field device is adapted to send data signals over the communications circuit, which data signals comprise one or more core functions, in which the communications circuit and/or the data signals function under one or more pre-determined normal operating parameters, in which the diagnostics apparatus is adapted to detect one or more pre-determined breaches of said normal operating parameters, in which a spur diagnostics module is connected to the spur section and is adapted to monitor electrical characteristics of the spur section, in which the spur diagnostics module comprises interference means adapted to interfere with the communications circuit and/or the data signals sent thereon such that said one or more pre-determined breaches of the normal operating parameters are detectable by the diagnostics apparatus, but such that said one or more core functions of the data signals are not effected, and in which the spur diagnostics module is adapted to activate said interference means when it detects one or more pre-determined electrical events in the spur section.

18 Claims, 4 Drawing Sheets

U.S. PATENT DOCUMENTS 6,912,671 B2  6/2005  Christensen et al.
2006/0176629 A1*  8/2006  Graube .......................... 361/58

FOREIGN PATENT DOCUMENTS

WO  2006063993 A2  6/2006
WO  2007096586 A1  8/2007

OTHER PUBLICATIONS

Gunter Rogall et al: "Advanced Online Physical Layer Diagnostics" Technical White Paper Pepperl + Fuchs, XX, XX, Aug. 30, 2006, page complete, XP002434472.

* cited by examiner

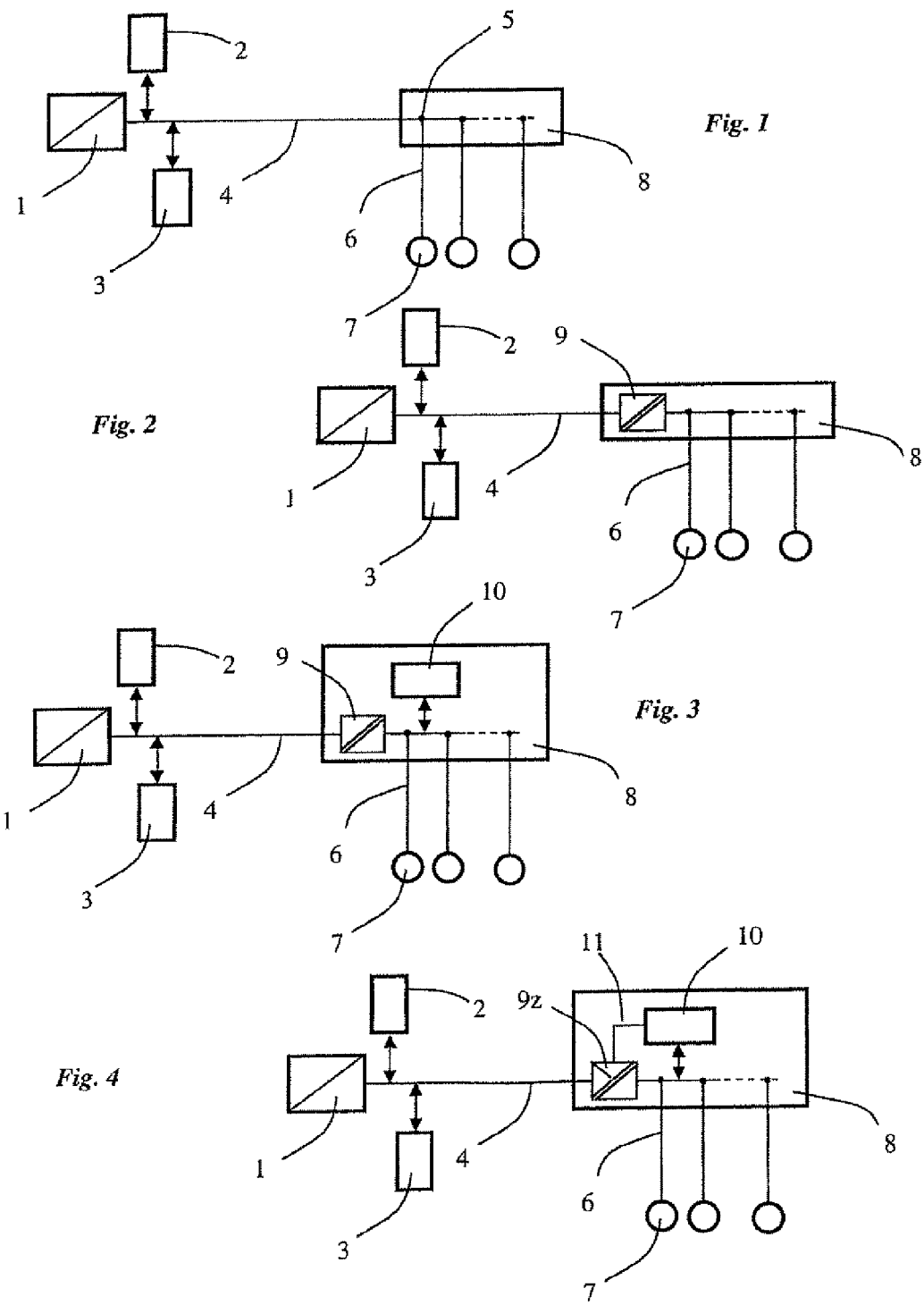

ELECTRICAL COMMUNICATIONS CIRCUIT WITH SPUR DIAGNOSTICS

CROSS REFERENCE TO RELATED APPLICATIONS

The present application is a national phase entry under 35 U.S.C. §371 of International Application No. PCT/GB2008/003841, filed Nov. 14, 2008, published in English, which claims the benefit of Great Britain Patent Application No. 0722460.3, filed Nov. 16, 2007 and Great Britain Patent Application No. 0804767.2, filed Mar. 14, 2008. The disclosures of said applications are incorporated by reference herein.

This invention relates to an electrical communications circuit with spur diagnostics, for use particularly, but not exclusively, as an improved Fieldbus physical layer diagnostics circuit.

Fieldbus (or field bus) is the name of a family of industrial computer network protocols used for real-time distributed control, now standardized as IEC 61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the fieldbus which links the PLCs to the components which actually do the work such as sensors, actuators, electric motors, console lights, switches, valves and contactors.

Fieldbus is often used in Intrinsically Safe environments, for example combustible atmospheres, and in particular gas group classification IIC, Hydrogen and Acetylene, and below, for example gas group IIB and IIA, for gas and/or dust. Using the Fieldbus protocol, field instruments and equipment in such an environment are controlled and monitored remotely via an electrical communications circuit often provided in the same electrical circuit as the power to drive the field instruments.

Fieldbus physical layer diagnostics for IEC 61158 type networks has been introduced successfully to the mainstream processing industry in the last few years. For example, FIG. 1 shows a typical electrical communications circuit comprising a power supply 1, a trunk section 4, a device coupler 8 and spur sections 6 connected thereto. Devices 7 are mounted on the spur sections 6, and in use they send data signals to a control system 2 mounted some distance away on the trunk section 4. A diagnostic module 3 is also mounted to the trunk section 4, usually at the same location as the control system 2, and it works by measuring physical layer variables associated with the network hardware, and in part, the physical software or protocol being used.

However, known diagnostic equipment like module 3 is only able to monitor and asses the health of any given network provided there is electrical or physical continuity between all the components to be monitored.

In Intrinsically Safe environments sections of electrical power and communications circuits are rendered intrinsically safe by isolating devices. FIG. 2 shows an electrical communications circuit like that shown in FIG. 1, but in which a galvanic isolator 9 is interposed between the trunk section 4 and the spurs 6, to render the spurs 6 intrinsically safe. Consequently physical layer attributes of the spurs 6 and the devices 7, such as unbalance to ground, noise level, voltage/signal levels, signal quality and so on, are autonomous and cannot be detected by the diagnostic module 3. This problem occurs with known galvanic isolator devices like the Fieldbarrier (Registered Trade Mark), and also with some couplers without galvanic isolation, for example those with spur resistance or reactance.

In order to overcome this problem it is known to use a field based diagnostics module to physically monitor the spurs. FIG. 3 shows an electrical communications circuit like that shown in FIG. 2, but in which a spur diagnostics module 10 has been introduced into the isolated device coupler 8, to enable the isolated spurs 6 and devices 7 to be physically monitored. However, there are problems associated with relaying data from the spur diagnostics module 10 to the control system 2 and/or the diagnostics module 3 some distance away. This is best achieved using the existing cable infrastructure, but it is already carrying a pre-designed volume of fieldbus telegram data, and adding further data adversely affects the data's bandwidth. Relaying the data using a discrete cable is a possible solution, however this is often not practical as it can impose a significant cost penalty on the design, hardware and installation.

The present invention is intended to overcome some of the above problems.

Therefore, according to the present invention an electrical communications circuit comprises a power supply, a trunk section, a spur section, isolation means disposed between the trunk section and the spur section, diagnostics apparatus connected to the trunk section and a field device connected to the spur section, in which the field device is adapted to send data signals over the communications circuit, which data signals comprise one or more core functions, in which the communications circuit and/or the data signals function under one or more pre-determined normal operating parameters, in which the diagnostics apparatus is adapted to detect one or more pre-determined breaches of said normal operating parameters, in which a spur diagnostics module is connected to the spur section and is adapted to monitor electrical characteristics of the spur section, in which the spur diagnostics module comprises interference means adapted to interfere with the communications circuit and/or the data signals sent thereon such that said one or more pre-determined breaches of the normal operating parameters are detectable by the diagnostics apparatus, but such that said one or more core functions of the data signals are not affected, and in which the spur diagnostics module is adapted to activate said interference means when it detects one or more pre-determined electrical events in the spur section.

Therefore, an electrical communications circuit of the present invention allows for a spur diagnostics module to communicate with the diagnostics apparatus using the existing infrastructure, but without affecting the performance of the normal data communications emanating from the field device.

The diagnostics apparatus of the invention can be a trunk diagnostics module, or it can be diagnostics functions incorporated into a control system. In most embodiments of the invention a trunk diagnostics module is utilised to detect the breaches of the normal operating parameters. Such a trunk diagnostics module also monitors the electrical characteristics of the trunk section. However, in other versions of the invention there is no trunk diagnostics module as such, and the diagnostics apparatus of the invention comprises diagnostics functions incorporated into a control system, the main purpose of which is to receive and send data signals to the field devices. This distinction is made clear in each of the below described embodiments.

The isolation means can comprise microprocessor based Fieldbus repeater technology, or simple resistance and/or reactance at the spur/trunk interface or between spurs. However, preferably the isolation means can comprise an intrinsically safe galvanic isolator adapted to render the spur section Intrinsically Safe.

The particular features of the circuit or the data signals which are interfered with to cause a breach of the normal operating parameters, can be a number of different things. For example, under the normal operating parameters the communications circuit can comprise physical layer attributes within pre-determined thresholds, and the interference means can be adapted to change a physical layer attribute of the trunk section such that it breaches one of said thresholds. This can readily be achieved by adjusting a detectable variable specific to the diagnostics apparatus. For example, the interference means can generate an induced cable unbalance signal, a voltage and/or current level change or transition, or a noise level change, which would be detectable by a trunk diagnostics module. The technical means by which this can be achieved is well known.

In one embodiment the interference means can comprise a relay mounted on a negative or a positive wire of the trunk section, and the spur diagnostics module can be adapted to drive said relay when it detects one or more pre-determined electrical events in the spur section, such that a cable unbalance is created in the trunk section, which is detectable by the diagnostics apparatus. It will be appreciated that this can be achieved without affecting the core functions of the data signal, by creating a pole to ground of a permitted value which merely has to be detectable by the diagnostics apparatus.

Alternatively, the interference means can comprise a common mode injection point mounted on the trunk section, and the trunk section can comprise a cable shield to which both the spur diagnostics module and the diagnostics apparatus refer to as a reference. The spur diagnostics module can be adapted to inject a common mode interference signal to the trunk section when it detects one or more pre-determined electrical events in the spur section, such that a common mode change is created in the trunk section, which is detectable by the diagnostics apparatus, via reference to the cable shield.

It will be appreciated that such arrangements must not affect the intrinsic safety of the spur section, and as such isolation means, galvanic or otherwise, can be employed between the spur diagnostics module and any connection to the trunk section.

As an alternative, the data signals themselves can be interfered with out affecting one or more of their core functions. ("Core functions" herein refers to the principal functionality of the field device, for example the pressure reading taken by a sensor. It will be appreciated that data sent from such a sensor to a control system usually comprises various secondary functions, for example diagnostics data, and a pre-amble byte which simply identifies incoming data.) Therefore, under the normal operating parameters in one version of the invention, the data signals can comprise a structure of a pre-amble and/or an end component thereof, and the interference means can be adapted to change the pre-amble or end component such that it deviates from said structure.

It will be appreciated that only a small percentage of most pre-amble or end component bits are used by any device for synchronization, therefore modifying deleting or adding one bit does not affect the function of the preamble or end component, but such a change can readily be detected by a suitably programmed trunk diagnostics module or control system.

The electric communications circuit preferably comprises a plurality of spurs, which can each carry a plurality of devices. One particular advantage of altering data signals as described above, is that device or spur specific alarms can be activated because the alteration is tagged to a particular device address. This makes it much easier to pinpoint the area of a fault. This is not possible when the same physical layer attribute of the trunk section is altered regardless of the fault.

In order to achieve the above arrangement the galvanic isolator can comprise a software layer repeater function, and the spur diagnostics module can comprise a microprocessor adapted to control said software layer repeater function, and in particular to add, remove or alter one or more bits of the preamble and/or the end component of the data signal during the repeater function. The kind of software programming required to achieve this function is known, and the man skilled in the art will be able to put it into effect.

In another version of the invention, under the normal operating parameters the data signals can comprise an alternating sequence of data transmission periods and quiet non-data transmission periods. The interference means can be adapted to send functional secondary data signals during quite non-data transmission periods, the presence of which are detectable by the diagnostics apparatus as a breach of said alternating sequence, and the functional meaning of which are understood by the diagnostics apparatus.

With this arrangement the spur diagnostics module communicates with the diagnostics apparatus only when the field device is not sending data signals. Therefore, the core functions of the data signals are obviously not affected. The advantage here is that the spur diagnostics module can send far more complex data signals to the diagnostics apparatus than can be achieved by adding or deleting one bit to simply indicate the presence of a fault. However, there is the disadvantage that there could be a delay before a quiet non-data transmission period.

In yet another version of the invention, under the normal operating parameters the data signals can comprise a section of field device diagnostic data, and the interference means can be adapted to delete said section of field device diagnostic data and replace it with spur diagnostic data.

In practice the section of field device diagnostic data usually comprises just one bit, which is used to communicate either a fault or a non-fault status, and in prior art arrangements a control system receiving the data signal detects the fault or non-fault status. In this embodiment of the invention when a spur fault is detected, the non-fault status bit in the data signal will be changed to a fault status bit, and this can be detected by either a trunk diagnostics module, or by a control system.

In order to achieve the above arrangement the galvanic isolator can comprise a software layer repeater function, and the spur diagnostics module can comprise a microprocessor adapted to control said software layer repeater function, and in particular to delete said section of field device diagnostic data and replace it with spur diagnostic data during the repeater function. The kind of software programming required to achieve this function is known, and the man skilled in the art will be able to put it into effect.

It will be appreciated that in practice a Fieldbus spur usually comprises a plurality of field devices, for example 12 devices. When this is the case the devices send their data signals in turn in a macro cycle. Therefore, 12 separate sections of field device data are sent every cycle. In order to differentiate between a single device fault and a spur fault, the software layer repeater function can delete all the sections of field device diagnostic data in the cycle and replace them with spur diagnostic data.

There is no limit to the manner in which the different sections of field device diagnostic data in a macro cycle can be overridden, and various different arrangements are possible. For example, in one version of the invention the section of field device diagnostic data for one or all of the field devices can be deleted and replaced with spur diagnostics data for only a given number of cycles, as opposed to in an on-going fashion. This would allow for subsequent device faults to be detected.

If it is desired to simply communicate that a fault has occurred, then deleting the section of field device diagnostic data and replacing it with spur diagnostics data is sufficient. Such a system essentially works as an alarm system, and users will then perform further manual or automated investigations to identify and resolve the fault.

In one particular configuration of this type, the entire electrical communications circuit diagnostics can be performed by the spur diagnostics module, and there can be no trunk diagnostics module. In this case the "diagnostics equipment" of the invention can be incorporated in a control system. The spur diagnostics module can comprise a connection to the trunk section, and it can be adapted to monitor electrical characteristics of the trunk section and activate the interference means when it detects one or more pre-determined electrical events in the trunk section. It will be appreciated that the connection to the trunk section must be Intrinsically Safe.

In addition, the spur diagnostics module can comprise interface means adapted to interface with diagnostics equipment with which the electrical communications circuit is used, such that an indicated fault can be diagnosed.

However, where more than a simple alarm is desired, the sections of field device diagnostic data in one or more macro cycles can be overridden such that a signal more complex than a simple binary fault/non-fault signal can be transmitted. With this arrangement specific diagnostic alarms can be transmitted.

For example, if there are 12 devices on a spur, the 12 single bits of field device diagnostics data in a micro cycle could all be deleted and replaced with bits which combine to form a 12 bit byte, which could accurately communicate the nature of the detected fault. However, extra processing power in the spur diagnostics module and the diagnostics apparatus would be required to put this version of the invention into effect.

It is not essential to the invention which of the above methods are employed. It will be appreciated that there will be site specific requirements, and that the skilled man will be able to put into effect whichever arrangement is most suitable.

As referred to above the diagnostics apparatus can comprise a control system. Known control systems are adapted to receive data from field devices and often comprise a multitude of complex features, including the ability to remotely control field devices. Therefore, preferably the electrical communications circuit can comprise a control system connected to the trunk section, which can be adapted to receive said data signals sent over the communications circuit from the field device, and which can be adapted to send control signals over the communications circuit to the field device, which control signals can comprise one or more core functions. In order to prevent failure of such control signals in use, the interference means can be adapted to interfere with the communications circuit and/or the data signals sent thereon such that said one or more core functions of the control signals are not effected. It will be appreciated that all of the above arrangements of interference means achieve this.

The above described alternative versions of the invention can be employed separately, or an electrical communications circuit according to the invention can comprise any combination of these features for enhanced functionality. For example, the spur diagnostics module could be adapted to change a physical layer attribute of the trunk section to indicate a fault, then send information on that fault using a secondary data signal sent during a quiet non-data transmission period. Alternatively the different methods of breaching the normal operating parameters could indicate different types of fault. For example a change to a physical layer attribute of the trunk section could indicate a make or break fault on any of the spurs, while a change to the structure of the preamble could indicate an unbalance in a particular spur.

However, regardless of which method of breaching the normal operating parameters is used, the spur section remains isolated and autonomous from the trunk section, so physical layer variables cannot be directly monitored via the trunk section. As such, with a number of the above arrangements a specific fault on a spur cannot be identified by the diagnostics apparatus.

Therefore, in one version of the invention, the diagnostics apparatus can comprise a trunk diagnostics module connected to the trunk section and adapted to monitor electrical characteristics of the trunk section, and a bypass means mounted in series with the isolation means, and adapted to connect the trunk section to the spur section upon receipt of a pre-determined command. This arrangement allows electrical characteristics of the spur section to be transferred to the trunk section and by monitored by the trunk diagnostics module.

It will be appreciated that if the spurs are disposed in an intrinsically safe environment, the bypass means cannot compromise the intrinsically safe standard. Therefore, the bypass means can comprise an intrinsically safe galvanic coupling. As an alternative, or in addition to this, the bypass means can comprise a shunt or blocking component that satisfies the requirements of the intrinsically safe standard. This could be one or more of inductors, capacitors or resistors, where a shunt resistance of four hundred and fifty kilo Ohms would pass less than five milliamps at two hundred and fifty volts r.m.s, and three blocking capacitors of an adequately low capacitance, which would be considered infallible.

In addition, if the trunk section and the spur section are connected together there could be a phase shift or mismatch of spur section data and trunk section data. If the spur side data is dissimilar to the trunk side data, then specific physical variables to be measured must be filtered from the data signal, i.e. noise levels should only be transferred from the spur section to the trunk section, without the spur data signal, or at least, without a detectable level of spur data. Therefore, the bypass means can comprise a filtering function adapted to filter out the spur data signal. The kind of software programming required to achieve this function is known, and the man skilled in the art will be able to put it into effect.

The invention can be performed in various ways, but four embodiments of the Invention will now be described by way of example, and with reference to the accompanying drawings, in which:

FIG. 1 is a diagrammatic view of a first prior art electrical communications circuit;

FIG. 2 is a diagrammatic view of a second prior art electrical communications circuit;

FIG. 3 is a diagrammatic view of a third prior art electrical communications circuit;

FIG. 4 is a diagrammatic view of a first electrical communications circuit according to the present invention;

Figure 5:
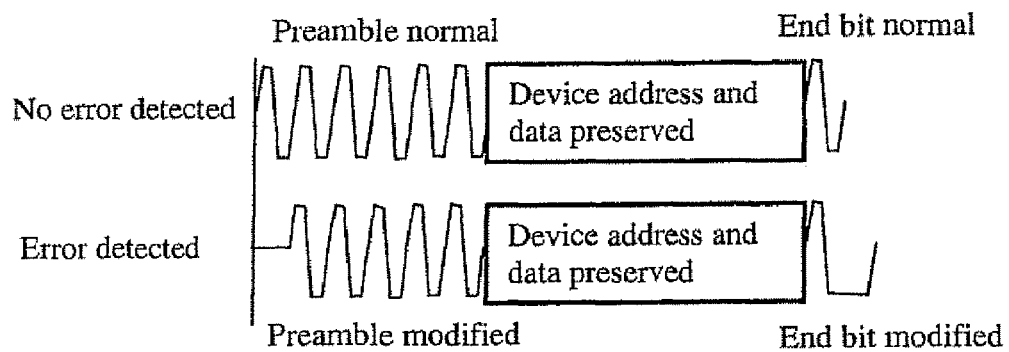
FIG. 5 is a diagrammatic view of data signals sent over the electrical communications circuit as shown in FIG. 4.

Therefore, as shown in FIG. 4, an electrical communications circuit comprises a power supply 1, a trunk section 4, a spur section 6, isolation means disposed between the trunk section 4 and the spur section 6, in the form of galvanic isolator 9z, diagnostics apparatus, in the form of trunk diagnostics module 3, which is connected to the trunk section 4, and a field device 7 connected to the spur section 6. As explained further below, the field device 6 is adapted to send data signals over the communications circuit to a control system 2, which data signals comprise one or more core functions. In the Figures the field device is not specific, but it could for example comprise a pressure sensor, with pressure readings comprising the core functions of the data signal.

The communications circuit and the data signals function under a number of pre-determined normal operating parameters. There are many normal operating parameters of the electrical communications circuit shown in FIG. 4, including upper and lower thresholds for physical layer attributes and the structure and format of the data signals. The trunk diagnostics module 3 is adapted to detect pre-determined breaches of these normal operating parameters. (In some instances described below such breaches are detected by the control system 2 instead, and either or both components can be the "diagnostics apparatus" of the invention)

A spur diagnostics module 10 is connected to the spur section 6 and is adapted to monitor electrical characteristics of the spur section 6. It also comprises interference means, various embodiments of which are explained further below, which are adapted to interfere with the communications circuit and/or the data signals sent thereon such that said one or more pre-determined breaches of the normal operating parameters are detectable by the trunk diagnostics module 3 (or the control system 2) but such that said core functions of the data signals are not affected. The spur diagnostics module 10 is adapted to activate these interference means when it detects one or more pre-determined electrical events in the spur section 6.

The electrical communications circuit shown in FIG. 4 comprises a plurality of spurs 6, and each spur 6 is shown as having one device 7 mounted on it, but it will be appreciated that in practice a plurality of field devices 7 can be mounted to each spur 6.

The galvanic isolator 9z comprises a software layer repeater function, which receives the data signals from the field devices 7 and retransmits them onto the trunk section 4. Therefore, low quality signals typical of longer spur lengths can be reshaped and retransmitted with a more accurate wave form. Galvanic isolators or repeaters which perform these functions are known.

However, in the electrical communications circuit shown in FIG. 4, the spur diagnostics module 10 comprises a microprocessor which is linked, as indicated at 11, to the galvanic isolator 9z, and the spur diagnostics module 10 is programmed to interfere with the repeater function of the galvanic isolator 9z, as described further below.

The spur diagnostics module 10 is adapted to monitor the current and the voltage of the spurs 6, unbalance, noise or signal jitter thereon, the data signal level and any short circuits. The spur diagnostics module 10 is programmed to monitor the spurs 6 for certain activity which is indicative of a fault, and to take action when such faults occur. Such diagnostics modules are generally known, however spur diagnostics module 10 activates the interference means when it detects faults.

The control system 2 is a complex system of electronics adapted to receive, interpret and display data from the field devices 7 to operators of the electrical communications circuit. The control system 2 also sends control signals to the field devices 7 to change their operational status in use. Such control systems are known. The trunk diagnostics module 3 is adapted to monitor electrical characteristics of the trunk section 4 in the normal way, and again such diagnostics functionality is known.

The field devices 7 send data signals to the control system 2, and these comprise a number of sections. In particular, referring to FIG. 5, the data signals comprise a pre-amble and an end bit. The top part of FIG. 5 illustrates the normal structure of the pre-amble and the end bit of the data signal.

When the spur diagnostics module 10 detects a fault on a particular spur 6, it interferes with the software layer repeater function of the galvanic isolator 9z via link 11, and modifies the pre-amble and/or the end bit of a data signal emanating from a field device 7 mounted on that spur 6. The bottom part of FIG. 5 illustrates a modified structure of both the pre-amble and the end bit, although in practice only one part need be modified. The modifications involve the deletion of a bit of the pre-amble, and/or an alteration to the shape of the end bit.

The trunk diagnostics module 3 is programmed to monitor the structure of the pre-amble and/or the end bit of the incoming data signals, and it detects when modifications have been made, and recognises this as a breach of the normal operating parameters of the circuit. The trunk diagnostics module 3 then activates a fault alarm for the spur 6 from which the data signal emanated.

The modifications to the pre-amble and/or the end bit are such that they still function as such as far as the control system 2 is concerned, and also such that the data bandwidth is not affected.

Figure 6:
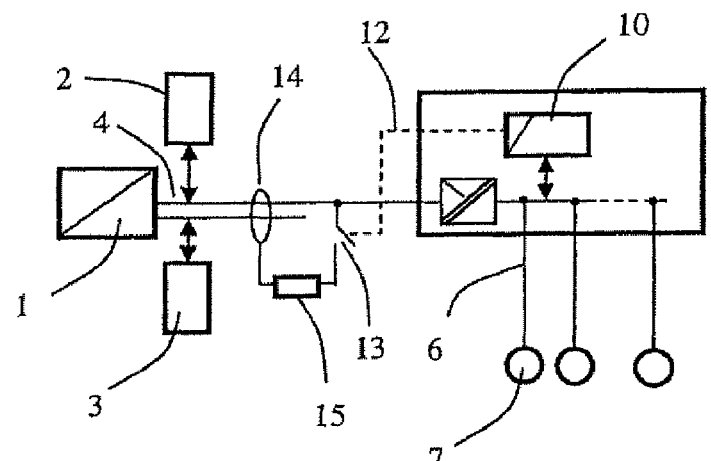
FIG. 6 is a diagrammatic view of a second electrical communications circuit according to the present invention.

FIG. 6 illustrates a second embodiment of the invention. The electrical communications circuit shown in FIG. 6 has several of the same components as the electrical communications circuit shown in FIG. 4, and where components are the same like reference numerals have been used.

In the electrical communications circuit shown in FIG. 6, the spur diagnostics module 10 comprises a relay 13 mounted on one of the wires of the trunk section 4. The spur diagnostics module 10 also comprises an intrinsic safety feature to ensure the spurs 6 remain intrinsically safe.

When the spur diagnostics module 10 detects a fault on any of the spurs 6, as described above, it drives the relay 13, as shown at 12, to create a pole to ground 14 fault of a pre-determined value 15, which is detectable by the trunk diagnostics module 3. The trunk diagnostics module 3 is programmed to recognise this generated pole to ground fault as a breach of the normal operating parameters of the electrical communications circuit, and to activate a fault alarm.

Figure 7:
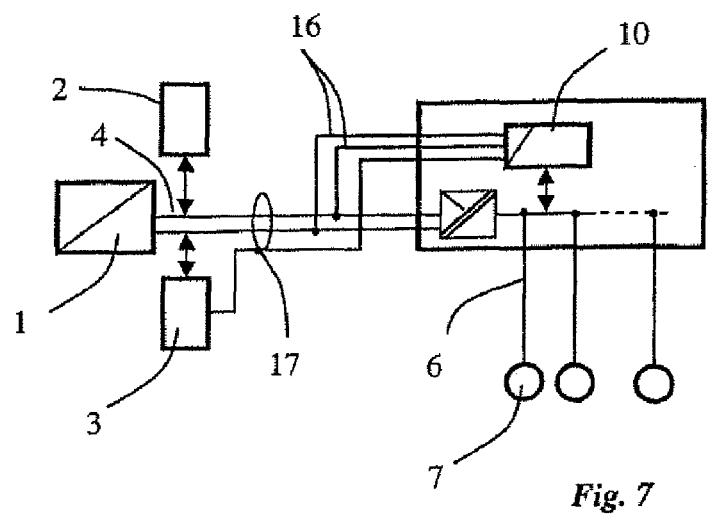
FIG. 7 is a diagrammatic view of a third electrical communications circuit according to the present invention.

FIG. 7 illustrates a third embodiment of the invention, and again like reference numerals have been used for components which are the same as those shown in FIGS. 4 and 6.

In the electrical communications circuit shown in FIG. 7, the spur diagnostics module 10 comprises a common mode link 16 to two wires of the trunk section 4. The trunk section 4 comprises a cable shield 15 to which both the spur diagnostics module 10 and the trunk diagnostics module 3 refer to as a reference.

When the spur diagnostics module 10 detects a fault on any of the spurs 6, as described above, it injects a common mode interference signal to the trunk section 4 such that a common mode change is created therein, which is detectable by the trunk diagnostics module 3, via reference to the cable shield 17. The trunk diagnostics module 3 is programmed to recognise this common mode change as a breach of the normal operating parameters of the circuit, and to activate a fault alarm.

In each of the above embodiments the spurs 6 are entirely autonomous from the trunk section 4, so electrical characteristics of the spurs 6 are not detectable by the trunk diagnostics module 3. However, this could be achieved with an extra feature, which is illustrated in FIG. 8.

Figure 8:
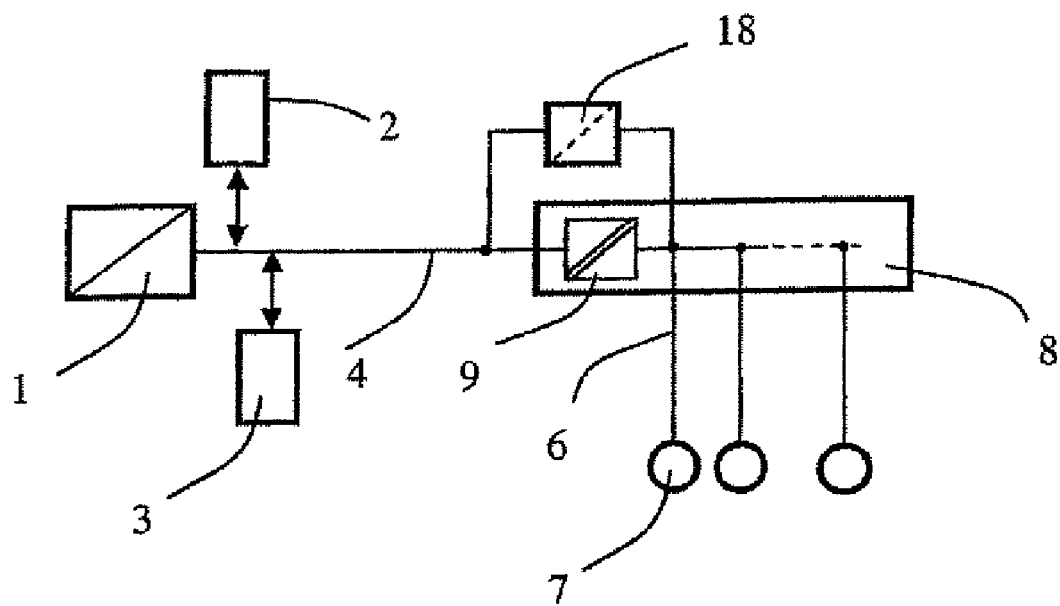
FIG. 8 is a diagrammatic view of an additional function of any electrical communications circuit according to the present invention.

As shown in FIG. 8, a bypass or shunt 18 is mounted in series with the galvanic isolator 9, and connects the trunk section 4 to a spur section 6. This arrangement allows electrical characteristics of the spur section 6 to be transferred to the trunk section 4 and by monitored by the trunk diagnostics module 3.

This shunt 18 comprises intrinsically safe galvanic coupling, but with specific filtering to filter out any data signals. This ensures safety and prevents phase shift or mismatch of spur section data and trunk section data.

Figure 9:
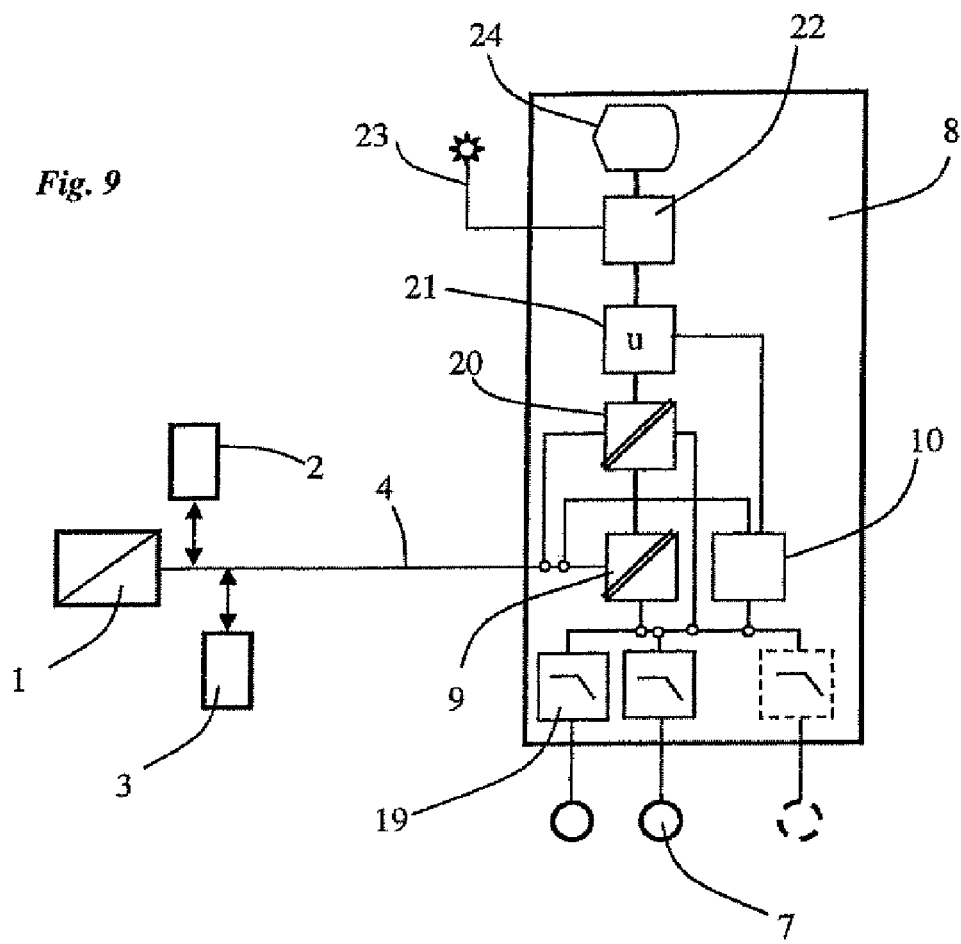
FIG. 9 is a diagrammatic view of a fourth electrical communications circuit according to the present invention.

FIG. 9 illustrates a fourth embodiment of the invention, and again like reference numerals have been used for components which are the same as those shown in the above Figures, however FIG. 9 provides greater detail.

In the electrical communications circuit shown in FIG. 9 the spurs 6 comprise short circuit protection units 19 which act to isolate the spurs 6 from the power supply 1 in the event of a short circuit event or the like.

FIG. 9 also separately shows software layer repeater 20 which repeats the data from the trunk section 4 to the spurs 6, and from the spur sections 6 to the trunk section 4. The microprocessor 21 which controls functions of the repeater 20 according to inputs from the spur diagnostic module 10 is also shown separately in FIG. 9.

The device coupler 8 in FIG. 9 also comprises an interface 22, which has wireless connectivity as shown at 23, and a display 24. These features allow an operator to access diagnostic and status data on site, to further diagnose any detected faults.

One further important feature of the electrical communications circuit shown in FIG. 9 is that the spur diagnostics module 10 comprises a connection to the trunk section 4, so it can monitor electrical characteristics of the trunk section 4, as well as those of the spurs 6. This allows the spur diagnostics module 10 to activate the interference means when it detects one or more pre-determined electrical events in the trunk section 4. At a basic level of functionality this removes the requirement for any trunk diagnostics module 3. (In the arrangement described below the control system 2 functions as the diagnostics apparatus of the invention, however the trunk diagnostics module 3 is still shown in FIG. 9, and it could play a part in monitoring the trunk, and detecting breaches of the normal operating parameters, should that be desired as an alternative.)

Figure 10:
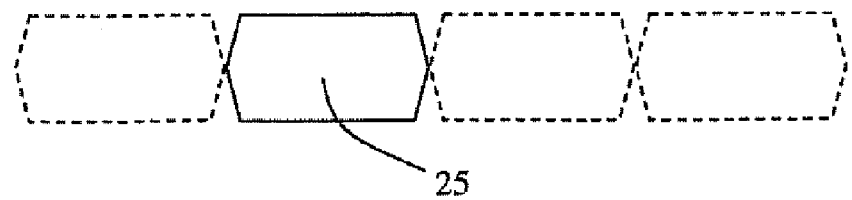
FIG. 10 is a diagrammatic view of a data signal sent over the electrical communications circuit as shown in FIG. 9.

As shown in FIG. 10, the data signals from the field devices 7 comprise sections, including a field device diagnostic data section 25. This section comprises just one bit, which is used to communicate either a fault or a non-fault status.

When the spur diagnostics module 10 detects a fault on any of the spurs 6, as described above, or on the trunk section 4, the microprocessor 21 interferes with the software layer repeater 20, and commands it to delete the non-fault status bits of all data signals being repeated for that particular spur, or all the spurs, and replace them with fault status bits. This apparent spur wide or system wide failure is detected by the control system 2, and recognised as a breach of the normal operating parameters of the circuit, and an alarm is activated. Operators of the system them attend to the device coupler 8 and diagnose the fault using any of the interfaces 22 to 24.

The electrical communications circuit shown in FIG. 9 can also be programmed to operate in an enhanced way. In particular, with the above described arrangement the system only indicates the presence or otherwise of a fault, and no fault specific information is provided.

Although only one field device 7 is shown on each of the spurs 6, in practice there can be a plurality of such devices, for example 12. When this is the case the field devices 7 send their data signals to the control system 2 in turn in a macro cycle. Therefore, 12 separate field device status bits are sent every cycle.

There is no limit to the manner in which the separate field device status bits in a macro cycle can be overridden by a suitably programmed microprocessor 21, and various different arrangements for enhanced functionality are possible.

For example, in one configuration the microprocessor 21 is programmed to command the repeater 20 to delete the non-fault status bits of all data signals being repeated and replace them with fault status bits, but for only a given number of macro cycles, as opposed to in an on-going fashion. This allows for the field device diagnostics data section 25 of the data signal to recover its functionality, so subsequent genuine faults in the field devices 7 can be detected by the control system 2.

In addition, in another configuration the microprocessor 21 is programmed to command the repeater 20 to delete the non-fault status bits of the data signals being repeated in one macro cycle, and replace them with bits which combine to form a 12 bit byte (or a byte size which is equivalent to the number of field devices on a spur 6), which is detectable and decipherable by the control system 2. With this arrangement specific diagnostic alarms can be transmitted.

The embodiments described above can be altered without departing from the scope of claim 1. For example, in one alternative embodiment (not shown) the data signals emanating from the spurs are transmitted according to an alternating sequence of data transmission periods and quiet non-data transmission periods. When the spur diagnostics module detects a fault on any of the spurs (and/or on the trunk section), as described above, it sends a functional secondary data signal to the control system during a quiet non-data transmission periods. The advantage here is that the spur diagnostics module can send far more complex data signals to the control system than simple fault/non-fault status signals. However, there is the disadvantage that there could be a delay before a quiet non-data transmission period.

In other alternative embodiments (not shown) electrical communications circuits comprise combinations of the above described arrangements, for enhanced functionality. For example, in one alternative embodiment (not shown) the spur diagnostics module changes the end bit of a data signal to indicate a fault, then sends a complex fault diagnostics data signal during a subsequent quiet non-data transmission period.

Therefore, the present invention provides an electrical communications circuit in which faults on isolated spurs can be communicated to home borne diagnostics apparatus without affecting the performance of the core functionality of the data being sent over the circuit.

The invention claimed is:

1. An electrical communications circuit comprising a power supply, a trunk section, a spur section, isolation means disposed between the trunk section and the spur section, diagnostics apparatus connected to the trunk section and a field device connected to the spur section,
in which the field device is adapted to send data signals over the communications circuit, which data signals comprise one or more core functions, one or more secondary functions and a transmission sequence,
in which under normal operating parameters the communications circuit comprises physical layer attributes within pre-determined thresholds,
in which a spur diagnostics module is connected to the spur section and is adapted to monitor electrical characteristics of the spur section,
in which the spur diagnostics module comprises interference means adapted to make a change to a physical layer attribute of the trunk section such that it breaches one of said ore-determined thresholds and/or to make a change to a secondary function or the transmission sequence of the data signals sent thereon, in which the diagnostics apparatus is adapted to detect said change, and
in which the spur diagnostics module is adapted to activate said interference means when it detects one or more pre-determined electrical events in the spur section.

2. The electrical communications circuit as claimed in claim 1 in which the isolation means comprises an intrinsically safe galvanic isolator adapted to render the spur section Intrinsically Safe.

3. The electrical communications circuit as claimed in claim 1 in which the interference means comprises a relay mounted on a negative or a positive of the trunk section, and in which the spur diagnostics module is adapted to drive said relay when it detects one or more pre-determined electrical events in the spur section, such that a cable unbalance created in the trunk section, which cable unbalance is detectable by the diagnostics apparatus.

4. The electrical communications circuit as claimed in claim 3 in which the interference means comprises a common mode injection point mounted on the trunk section, in which the trunk section comprises a cable shield, in which both the spur diagnostics module and the diagnostics apparatus refer to the cable shield as a reference, and in which the spur diagnostics module is adapted to inject a common mode interference signal to the trunk section when it detects one or more predetermined electrical events in the spur section, such that a common mode change is created in the trunk section, which common mode change is detectable by the diagnostics apparatus, via reference to the cable shield.

5. The electrical communications circuit as claimed in claim 2 in which under the normal operating parameters the data signals comprise a structure of a pre-amble and/or an end component thereof, and in which the interference means is adapted to change the pre-amble or end component such that it deviates from said structure.

6. The electrical communications circuit as claimed in claim 5 in which the galvanic isolator comprises a software layer repeater function, in which the spur diagnostics module comprises a microprocessor adapted to control said software layer repeater function, and in which the spur diagnostics module is adapted to add, remove or alter one or more bits of the pre-amble and/or the end component of the data signal during the repeater function.

7. The electrical communications circuit as claimed in claim 2 in which under the normal operating parameters the data signals comprise an alternating sequence of data transmission periods and quiet non-data transmission periods, and in which the interference means is adapted to send functional secondary data signals to the diagnostics apparatus during quite non-data transmission periods, the presence of
which are detectable by the diagnostics apparatus as a breach of said alternating sequence, and the functional meaning of which are understood by the diagnostics apparatus.

8. The electrical communications circuit as claimed in claim 2 in which under the normal operating parameters the data signals comprise a section of field device diagnostic data, and in which the interference means is adapted to delete said section of field device diagnostic data and replace it with spur diagnostic data.

9. The electrical communications circuit as claimed in claim 8 in which the galvanic isolator comprises a software layer repeater function, in which the spur diagnostics module comprises a microprocessor adapted to control said software layer repeater function, and in which the spur diagnostics module is adapted to delete said section of field device diagnostic data and replace it with spur diagnostic data during the repeater function.

10. The electrical communications circuit as claimed in claim 9 in which a plurality of field devices are connected to the spur section, in which the plurality of field devices are adapted to send their respective data signals over the communications circuit in a macro cycle, and in which the spur diagnostics module is adapted to delete the sections of field device data in each data signal, and replace them with the spur diagnostics data.

11. The electrical communications circuit as claimed in claim 10 in which the spur diagnostics module is adapted to delete the sections of field device data in each data signal and replace them with the spur diagnostics data for a pre-determined number of macro cycles.

12. The electrical communications circuit as claimed in claim 11 in which the spur diagnostics module comprises a connection to the trunk section, in which the spur diagnostics module is adapted to monitor electrical characteristics of the trunk section, and in which the spur diagnostics module is adapted to activate the interference means when it detects one or more pre-determined electrical events in the trunk section.

13. The electrical communications circuit as claimed in claim 1 in which a communications device is connected to the trunk section, in which the communications device is adapted to receive said data signals sent over the communications circuit from the field device, in which the communications device is adapted to send control signals over the communications circuit to the field device, which control signals comprise one or more core functions.

14. The electrical communications circuit as claimed in claim 1 in which the diagnostics apparatus comprises a trunk diagnostics module connected to the trunk section and adapted to monitor electrical characteristics of the trunk section.

15. The electrical communications circuit as claimed in claim 14 in which the electrical communications circuit comprises a bypass means mounted in series with the isolation means, and adapted to connect the trunk section to the spur section upon receipt of a pre-determined command such that electrical characteristics of the spur section are transferred to the trunk section and are monitorable by the trunk diagnostics module.

16. An electrical communications circuit comprising a power supply, a trunk section, a spur section, isolation means disposed between the trunk section and the spur section, diagnostics apparatus connected to the trunk section and a field device connected to the spur section, in which the field device is adapted to send data signals over the communications circuit, which data signals comprise one or more core functions, in which the communications circuit and/or the data signals function under one or more pre-determined normal operating parameters, in which the diagnostics apparatus is adapted to detect one or more predetermined breaches of said normal operating parameters, in which a spur diagnostics module is connected to the spur section and is adapted to monitor electrical characteristics of the spur section, in which the spur diagnostics module comprises interference means adapted to interfere with the communications circuit and/or the data signals sent thereon such that said one or more pre-determined breaches of the normal operating parameters are detectable by the diagnostics apparatus, but such that said one or more core functions of the data signals are not effected, and in which the spur diagnostics module is adapted to activate said interference means when detects one or more pre-determined electrical events in the spur section, in which the isolation means comprises an intrinsically safe galvanic isolator adapted to render the spur section Intrinsically Safe, in which under the normal operating parameters the communications circuit comprises physical layer attributes within pre-determined thresholds, and in which the interference means is adapted to chance a physical layer attribute of the trunk section such that it breaches one of said thresholds.

17. An electrical communications circuit comprising a power supply, a trunk section, a spur section, isolation means disposed between trunk section and the spur section, diagnostics apparatus connected to the trunk section and a field device connected to the spur section, in which the field device is adapted to send data signals over the communications circuit, which data signals comprise one or more core functions, in which the communications circuit and/or the data signals function under one or more pre-determined normal operating parameters, in which the diagnostics apparatus is adapted to detect one or more predetermined breaches of said normal operating parameters, in which a spur diagnostics module is connected to the spur section and is adapted to monitor electrical characteristics of the spur section, in which the spur diagnostics module comprises interference means adapted to interfere with the communications circuit and/or the data signals sent thereon such that said one or more pre-determined breaches of the normal operating parameters are detectable by the diagnostics apparatus, but such that said one or more core functions of the data signals are not effected, and in which the spur diagnostics module is adapted to activate said interference means when it detects one or more pre-determined electrical events in the spur section, in which the isolation means comprises an intrinsically safe galvanic isolator adapted to render the spur section Intrinsically Safe, in which under the normal operating parameters the data signals comprise a structure of a pre-amble and/or an end component thereof, in which the interference means is adapted to change the pre-amble or end component such that it deviates from said structure, and in which the galvanic isolator comprises a software layer repeater function, in which the spur diagnostics module comprises a microprocessor adapted to control said software layer repeater function, and in which the spur diagnostics module is adapted to add, remove or alter one or more bits of the pre-amble and/or the end component of the data signal during the repeater function.

18. The electrical communications circuit as claimed in claim 17 in which under the normal operating parameters the communications circuit comprises physical layer attributes within pre-determined thresholds, and in which the interference means is adapted to change a physical layer attribute of the trunk section such that it breaches one of said thresholds.

* * * * *